United States Patent
Griffin et al.

(10) Patent No.: US 9,473,742 B2
(45) Date of Patent: Oct. 18, 2016

(54) MOMENT CAPTURE IN A COLLABORATIVE TELECONFERENCE

(71) Applicant: Cisco Technology, Inc., San Jose, CA (US)

(72) Inventors: Keith Griffin, Galway (IE); Jonathan D. Rosenberg, Freehold, NJ (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/525,129

(22) Filed: Oct. 27, 2014

(65) Prior Publication Data
US 2016/0119581 A1   Apr. 28, 2016

(51) Int. Cl.
*H04N 7/15* (2006.01)
(52) U.S. Cl.
CPC .................................... *H04N 7/15* (2013.01)
(58) Field of Classification Search
CPC .............. G06F 17/30056; H04H 7/15; H04N 21/4312
USPC ....................................................... 348/14.08
See application file for complete search history.

(56) References Cited

U.S. PATENT DOCUMENTS

| | | | |
|---|---|---|---|
| 2007/0263603 A1 | 11/2007 | Schmitt | |
| 2008/0256463 A1* | 10/2008 | Li | G06F 17/30056 715/756 |
| 2010/0048235 A1 | 2/2010 | Dai et al. | |
| 2010/0053302 A1* | 3/2010 | Ivashin | H04N 7/147 348/14.08 |
| 2011/0010623 A1* | 1/2011 | Vanslette | H04N 5/77 715/704 |
| 2011/0268418 A1 | 11/2011 | Jones et al. | |

FOREIGN PATENT DOCUMENTS

GB   2352845 A   2/2001

OTHER PUBLICATIONS

Shirmohammadi, Shervin et al., "An Approach for Recording Multimedia Collaborative Sessions: Design and Implementation," University of Ottawa, Ottawa, Canada, Accessed on Jul. 28, 2014.

\* cited by examiner

*Primary Examiner* — Creighton Smith
(74) *Attorney, Agent, or Firm* — Polsinelli PC

(57) ABSTRACT

The disclosed technology addresses the need in the art for capturing a moment of an active teleconference meeting. A teleconference system can enable meeting participants to capture a moment of the teleconference by providing a user interface element enabling the meeting participants to capture a moment of the teleconference. The captured moments can then be revisited or shared by the meeting participants. The teleconference system can present captured moment indicators representing the captured moments to the meeting participants which can be selectable to revisit the captured moment. Further, the teleconference system can enable the meeting participants to provide feedback to the captured moments, which can be used to assign a social strength the capture moments. The teleconference system can present the captured moment indicators according to the social strength of their corresponding captured moment.

21 Claims, 7 Drawing Sheets

MOMENT CAPTURE IN A COLLABORATIVE TELECONFERENCE

TECHNICAL FIELD

The present disclosure pertains to teleconferences, and more specifically pertains to capturing a moment during a teleconference.

BACKGROUND

Teleconferences allow participants to meet from multiple locations through use of their computing devices. For example, meeting participants from multiple geographic locations can join the teleconference and communicate with each other to discuss issues, share ideas, etc. While teleconferences provide the ability for meeting participants to participate from various locations, current systems, like live meetings, do not allow meeting participants to capture a moment of the meeting or revisit the moment at a later time. At best, current systems may provide a full recording of the teleconference, requiring a meeting participant to record the time at which an interesting moment occurred to be able to later discuss it with other meeting participants or colleagues. This can provide difficult and distract meeting participants from fully participating in the meeting. Accordingly, improvements are needed.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

The disclosed technology addresses the need in the art for capturing a moment of an active teleconference meeting. A teleconference system can enable meeting participants to capture a moment of the teleconference. For example, the teleconference system can provide the meeting participants with a user interface element, such as a button, that, when selected, captures a moment of the teleconference.

Capturing a moment can include capturing content presented via one or more of the channels during a specified duration of the teleconference. For example, the captured moment can include video, audio, files, etc., presented during a configurable short duration of the teleconference, such as 30 seconds of the teleconference.

The teleconference system can notify the meeting participants that a moment was captured by presenting a captured moment indicator representing that the moment has been captured. The teleconference system can present the captured moment indicator along a time-line bar of the teleconference, thereby alerting the meeting participants of the captured moments and their chronological order during the teleconference. A captured moment indicator can be selectable to allow any of the meeting participants to revisit the respective captured moment.

The teleconference system can also enable meeting participants to provide feedback to the captured moments by, for example, commenting on the captured moments, liking or disliking the captured moments, sharing the captured moments, etc. The teleconference system can also assign a social strength to the captured moments based on the received feedback. For example, the teleconference system can assign a higher social strength the captured moments that received more feedback, likes, shares, etc. Further, the teleconference system can assign a social strength based on the number of meeting participants that captured the moment of the teleconference. The teleconference system can then present or alter the presentation of the captured moment indicators based on the social strength of their corresponding captured moment. For example, captured moment indicators representing captured moments assigned a high social strength can be presented more prominently than captured moment indicators representing captured moments assigned a lower social strength.

Example Embodiments

Figure 1:
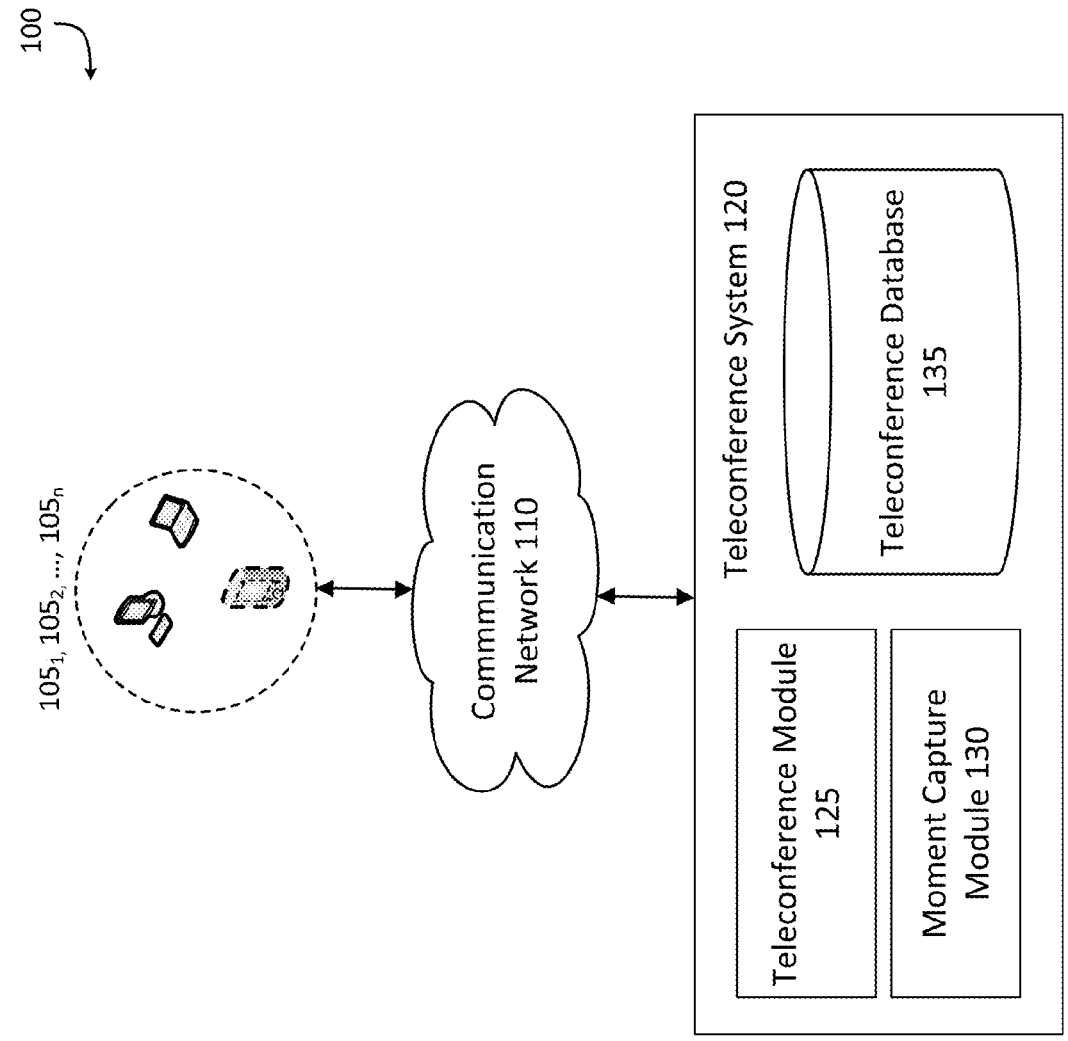
FIG. 1 shows an example configuration of devices and a network.

FIG. 1 shows an example system configuration 100, wherein electronic devices communicate via a network for purposes of exchanging content and other data. As shown, multiple computing devices (Client device 105, client device 115 and teleconference system 120) can be connected to communication network 110 and be configured to communicate with each other through use of communication network 110. Communication network 110 can be any type of network, including a local area network ("LAN"), such as an intranet, a wide area network ("WAN"), such as the internet, or any combination thereof. Further, communication network 110 can be a public network, a private network, or a combination thereof. Communication network 110 can also be implemented using any number of communications links associated with one or more service providers, including one or more wired communication links, one or more wireless communication links, or any combination thereof. Additionally, communication network 110 can be configured to support the transmission of data formatted using any number of protocols.

Multiple computing devices can be connected to communication network 110. A computing device can be any type of general computing device capable of network communication with other computing devices. For example, a computing device can be a personal computing device such as a desktop or workstation, a business server, or a portable computing device, such as a laptop, smart phone, or a tablet PC. A computing device can include some or all of the features, components, and peripherals of computing device 500 of FIGS. 5A and 5B.

To facilitate communication with other computing devices, a computing device can also include a communication interface configured to receive a communication, such as a request, data, etc., from another computing device in network communication with the computing device and pass the communication along to an appropriate module running on the computing device. The communication interface can also be configured to send a communication to another computing device in network communication with the computing device.

In system 100, meeting participants can interact with teleconference system 120 through client devices 105 connected to communication network 110 by direct and/or indirect communication. System 100 can include any number of client devices 105 and teleconference system 120 can concurrently accept connections from and interact with multiple client devices 105. Teleconference system 120 can also support connections from a variety of different types of client devices, such as desktop computers; mobile computers; mobile communications devices, e.g. mobile phones, smart phones, tablets; smart televisions; set-top boxes; and/or any other network enabled computing devices. Client devices 105 can be of varying type, capabilities, operating systems, etc.

A meeting participant can interact with teleconference system 120 via a client-side application installed on client devices 105. In some embodiments, the client-side application can include a teleconference system specific component. For example, the component can be a stand-alone application, one or more application plug-ins, and/or a browser extension. However, the meeting participant can also interact with teleconference system 120 via a third-party application, such as a web browser, that resides on client devices 105 and is configured to communicate with teleconference system 120. In either case, the client-side application can present a user interface (UI) for the user to interact with teleconference system 120. For example, the user can interact with the teleconference system 120 via a client-side application integrated with the file system or via a webpage displayed using a web browser application.

Teleconference system 120 can be configured to facilitate and manage teleconference meetings between various client devices 105. A teleconference can be a meeting or conference with meeting participants at different geographic locations linked by computing devices. For example, teleconference system 120 can facilitate a teleconference between client device $105_i$ and client device $105_j$, where a meeting participant at client device $105_i$ can send and receive multiple channels of content to a meeting participant at client device $105_j$. For example, teleconference system 120 can facilitate transfer of video, audio, text, screen share, etc. between the meeting participants. A teleconference can include one or more of these different channels of content.

To accomplish this, teleconference system 120 can include teleconference management module 125 configured to manage a teleconference between multiple client devices 105, including initiating the teleconference, identifying the client devices 105 included in the teleconference and sending and receiving teleconference data to and from the various client devices 105 engaged in the teleconference. For example, to manage a teleconference between meeting participants at client device $105_i$, and client device $105_j$, teleconference management module 125 can receive teleconference data, including multiple channels of content such as, audio, video, text, screen share, etc., from client device $105_i$, and transmit the received teleconference data to client device $105_j$, where it can be presented by client device $105_j$. Likewise, teleconference management module 125 can receive video conference data from client device $105_j$ and transfer the received teleconference data to client device $105_i$, where it can be presented by client device $105_i$. This can allow meeting participants at client device $105_i$, and client device $105_j$ to receive and share data, including multiple channels of content such as audio, video, text, screen share, files, etc., thereby enabling the meeting participants to have a real time meeting although the meeting participants may be in different geographic locations.

In some embodiments, teleconference system 120 can be configured to enable meeting participants to capture a moment of a teleconference. For example, a meeting participant may wish to capture a moment of the teleconference that the meeting participant considers interesting or important and that the meeting participant would like to share with others or revisit at a later time. Teleconference system 120 can be configured to enable the meeting participant to capture a moment of a video conference while attending the teleconference.

To accomplish this, teleconference system 120 can include moment capture module 130. Moment capture module 130 can enable meeting participants to capture moments of a teleconference. For example, moment capture module 130 can provide meeting participants with a user interface element, such as a button, that enables the meeting participants to capture a moment of the teleconference. The user interface element can be configured such that a meeting participant can select or interact with the provided user interface element to capture a moment of the teleconference.

Upon selection or other designated user interaction, the user interface element can cause a client device 105 to transmit a moment capture request to teleconference system 120. A moment capture request can request that a moment of the teleconference be captured. A moment capture request can include metadata describing the request, such as a teleconference identifier identifying the teleconference, the time at which the meeting participant selected to capture a moment, data identifying the requesting meeting participant, moment capture settings specified by the meeting participant, etc. In response to receiving a moment capture request, moment capture module 130 can capture the requested moment of the teleconference.

Capturing a moment of the teleconference can include capturing one or more channels of content presented during a specified duration of the teleconference. For example, capturing a moment can include capturing video, audio, text, files etc., presented or shared as part of the teleconference during the specified duration.

Teleconference system 120 can store all or a portion of the teleconferences facilitated by teleconference system 120. For example, teleconference system 120 can include teleconference database 135 that maintains teleconference data and teleconference module 125 can store all or some of the teleconference data managed by teleconference system 120 in teleconference database 135. The teleconference data stored in 135 can include all or some of the content presented as part of the teleconference as well as metadata describing the data, such as a time stamp, teleconference identifier, meeting participants, etc.

To capture a moment of a teleconference, moment capture module 130 can access teleconference database 135 and gather the teleconference data for the specified duration. In some embodiments, moment capture module 130 can create an individual artifact that includes the gathered teleconference data for the duration. Alternatively, in some embodiments, moment capture module 130 can record the start time and end time of the captured moment, which can be used to access the corresponding teleconference data in teleconference database 135.

In some embodiments, the duration of a captured moment can be a predetermined amount of time, such as 10 second, 20 second, 30 seconds, etc. Alternatively, in some embodiments, the duration can be variable. For example, moment capture module 130 can enable meeting participants to set the duration of the captured moment. Moment capture module 130 can provide meeting participants with a moment capture interface that enables the meeting participants to set the duration of the captured moment. The moment capture interface can include user interface elements, such as buttons, text boxes, etc., that enable the meeting participant to set the duration of the captured moment.

Moment capture module 130 can determine the start time and end time of the captured moment based on the duration of the captured moment and the time at which a meeting participant requested to capture the moment. For example, the end time of the captured moment can coincide with the time the meeting participant's selected to capture the moment, resulting in the captured moment spanning the duration of the teleconference prior to the meeting participant selecting to capture the moment. Thus, a meeting participant can select the provided user interface element to capture a moment of the teleconference at the conclusion of the moment.

Alternatively, in some embodiments, the start time of the captured moment can coincide with the meeting participant selecting to capture a moment. Accordingly, the captured moment would span the duration of the teleconference after the meeting participant selected to capture the moment. A meeting participant can select the provided user interface element to capture a moment at the beginning of the moment. Alternatively, in some embodiments, the time at which the meeting participant selects to capture a moment of the teleconference can be at a point between the start time and end time of the captured moment. The resulting captured moment would thus span a duration of the teleconference beginning before the meeting participant selected to capture a moment and ending after the meeting participant selected to capture the moment.

Moment capture module 130 can notify the meeting participants that a moment was captured. For example, moment capture module 130 can present the meeting participants with a captured moment indicator that represents the captured moment. A captured moment indicator can be any type of presented indicator, such as an icon, text, etc., that represents the captured moment. In some embodiments, moment capture module 130 can list the captured moment within a timeline bar presented as part of the teleconference.

A timeline bar can be any type of list, bar, etc., that represents the teleconference. For example, the timeline bar can be a list, such as a data feed of events or moments of the teleconference. The events, moments, etc., can be presented in the timeline bar according to the chronological order they occurred and moment capture module 130 can present captured moment indicators in the timeline bar accordingly. Alternatively, the timeline bar can be a timeline that represents the entire length of the teleconference. Moment capture module 130 can present a captured moment indicator along the time line at the point that corresponds to the moment of the teleconference that was captured.

In some embodiments, the captured moment indicator can enable the meeting participants to revisit the captured moment. For example, the captured moment indicator can be selectable to enable a meeting participant to request to revisit the captured moment. Upon selection, the captured moment indicator can cause a client device 105 to transmit a request to teleconference system 120 to revisit the captured moment. The request can include metadata describing the request, such as an identifier for the requested captured moment, teleconference identifier, requesting meeting participant, etc. In response to the request, teleconference system 120 can provide the teleconference data for the captured moment to the requesting client device 105, where the captured moment can be presented for the meeting participant, thereby allowing the meeting participant to revisit the captured moment.

In some embodiments, moment capture module 130 can provide the captured moment to the meeting participants as an individual artifact. An individual artifact can be an individual file such as a content item that a meeting participant can store to their client device 105. Moment capture module 130 can transmit the captured moment as an individual artifact to a meeting participant's client device 105 as part of the teleconference and the meeting participant can save the artifact to their client device. Alternatively, moment capture module 130 can transmit the captured moment to a meeting participant in an e-mail or via another contact method.

In some embodiments, moment capture module 130 can provide social functionality to the captured moments. For example, moment capture module 130 can enable the meeting participants to provide feedback regarding the captured moments, such as leaving comments, liking/disliking a captured moment, etc. Moment capture module 130 can provide the received feedback along with the captured moment indicator for the captured moment, thereby allowing the meeting participants to share feedback and discuss a captured moment.

In some embodiments, moment capture module 130 can enable meeting participants to share a captured moment. For example, moment capture module 130 can enable meeting participants to select to share a captured moment and provide contact information for a friend or colleague that the meeting participant would like to share the captured moment with. Moment capture module 130 can then share the captured moment with the identified recipient by transmitting the captured moment as an artifact or a link to access the captured moment to the recipient via the provided contact information. Further, moment capture module 130 can enable meeting participants to include a message along with the shared captured moment.

In some embodiments, moment capture module 130 can assign a social strength to the captured moments. For example, moment capture module 130 can assign a social strength to the captured moments based on feedback received form the meeting participants, such as the number of meeting participants that provided feedback to a captured moment, the number of meeting participants that provided positive feedback to a captured moment, etc. Moment capture module can assign a higher social strength to captured moments that received a higher amount of feedback, positive feedback, etc., while providing a lower social strength to captured moments that received a lower amount of feedback, negative feedback, etc.

In some embodiments, moment capture module 130 can assign a social strength to the captured moments based on the number of meeting participants that captured the moment. Moment capture module 130 can assign a higher social strength to captured moments that have been captured by a higher number of meeting participants, while giving a lower priority or ranking to captured moments that have been captured by a lower number of meeting participants.

Moment capture module 130 can determine that a moment was captured by multiple meeting participants in numerous ways. For example, moment capture module 130 can determined that a moment of a teleconference was captured by multiple meeting participants if at least a portion of the duration of the moment captured by each meeting participant overlaps with each other. For example, moment capture module 130 can determine that a moment was moment captured by the meeting participants overlap with each other. Alternatively, moment capture module 130 can determine that multiple meeting participants captured the same moment if at least a predetermined duration of the moments capture by each meeting participant overlap, such as a predetermined amount of time or predetermined percentage of the captured moments.

In some embodiments, moment capture module 130 can determine that a moment was captured by multiple meeting participants if at least a portion of the captured moments are within a predetermined time range of each other. For example, moment capture module 130 can determine that a moment was captured by multiple meeting participants if the meeting participants capture a moment within 5 seconds of each other, even if the captured moments do not overlap.

Moment capture module 130 can present the captured moment indicators based on the social strength of their respective captured moments. For example, captured moment indicators for captured moments assigned a higher social strength, i.e. captured moments that received the most feedback, most positive feedback, were captured by the most meeting participants, etc., can be presented prominently or more prominently than captured moment indicators that represent captured moments that were assigned a lower social strength, i.e. received less feedback, negative feedback or were captured by a fewer number of meeting participants.

Moment capture module 130 can present captured moment indicators prominently in numerous ways. For example moment capture module 130 can increase the size of a captured moment indicator to present the captured moment indicator more prominently. Further, moment capture module 130 can highlight or bold a captured moment indicator to present it more prominently. These are just a few examples and are not meant to be limiting. One skilled in the art would recognize that a captured moment indicator can be presented prominently in numerous ways known in the art.

Although the present disclosure describes meeting participants capturing moments of a teleconference during the teleconference, this is only one example and is not meant to be limiting. In some embodiments, moment capture module 130 can enable meeting participants to capture a moment of a teleconference when viewing a recording of the teleconference.

Figure 2:
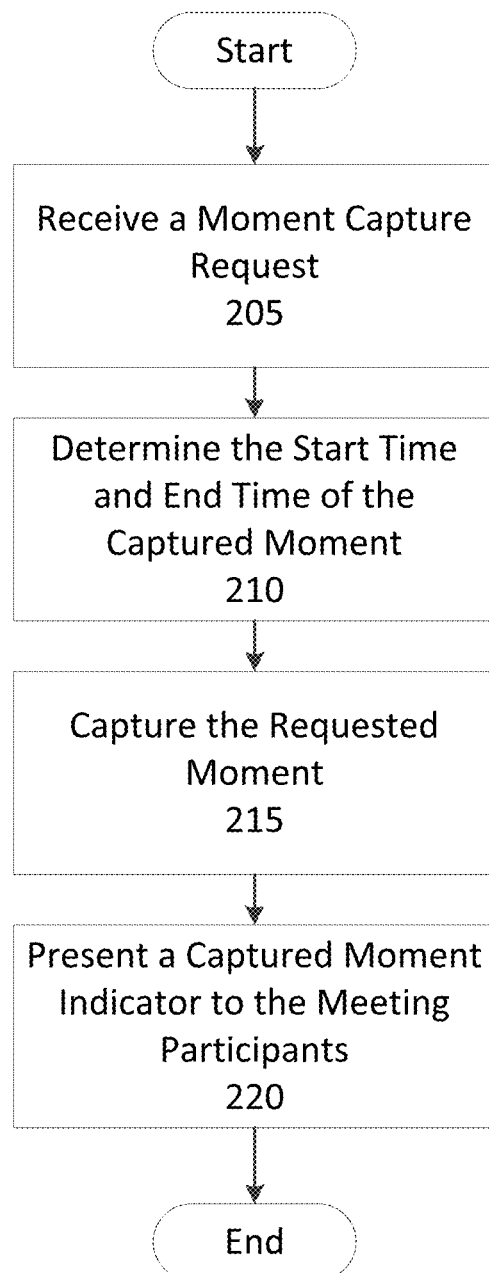
FIG. 2 shows a method of capturing a moment of a teleconference.

FIG. 2 shows a method of capturing a moment of a teleconference. The method is described in view of the system described in FIG. 1. As shown, the method begins at block 205 where teleconference system 120 receives a moment capture request from a meeting participant's client device 105. A moment capture request can be a request to capture a moment of a teleconference. The moment capture request can be received as a result of a meeting participant selecting a user interface element provided to the meeting participants as part of the teleconference. The user interface element can be configured to receive a user selection or other type of interaction that enables the meeting participant to request to capture a moment of the teleconference.

The received moment capture request can include metadata describing the request. For example, the moment capture request can include a teleconference identifier identifying the teleconference, the time at which the meeting participant selected to capture the moment, data identifying the requesting meeting participant, moment capture parameters provided by the requesting meeting participant, etc.

At block 210, the teleconference system 120 can determine the start time and end time of the captured moment. Teleconference system 120 can determined the start and end time from the time at which the meeting participant selected to capture the moment as well as the duration of the captured moment. The duration of the captured moment can be a set length or, alternatively, a length dictated by the requesting meeting participant.

At block 215, the teleconference system 120 can capture the requested moment of the teleconference. Teleconference system 120 can capture a moment in numerous ways. For example, teleconference system 120 can record the start time and end time of the captured moment, which can later be referenced to identify the duration of the captured moment. For example, teleconference system 120 can store all teleconference data shared as part of a teleconference. The stored teleconference data can include time stamp date indicating the time at which the teleconference data was presented as part of the teleconference and teleconference system 120 can use the recorded start time and end time of a captured moment to locate the teleconference data presented for the duration of the captured moment. Alternatively, teleconference system 120 can create a separate artifact that includes the teleconference data presented during the duration of the captured moment.

At block 220, teleconference system 120 can present a captured moment indicator to the meeting participants. A captured moment indicator can be any type of indicator that indicates that the moment has been captured. For example, the captured moment indicator can be text, a link, an icon, etc. Teleconference system 120 can present the captured moment indicator along a timeline bar that represents events and moments of the teleconference. For example, the timeline bar can be a feed that lists events, moments, etc. that occurred during the teleconference. Alternatively, the timeline bar can be a timeline that represents the entire length of the teleconference and teleconference system 120 can present a captured moment indicator along the time line at the point that corresponds to the moment of the teleconference that was captured.

In some embodiment, teleconference system 120 can also provide the artifact to one or more of the meeting participants. For example, teleconference system 120 can provide the artifact to the requesting meeting participant's client device, either as part of the teleconference or, alternatively, through another communication method such as e-mail. Alternatively, teleconference system 120 can provide the artifact to each one of the meeting participants.

Figure 3:
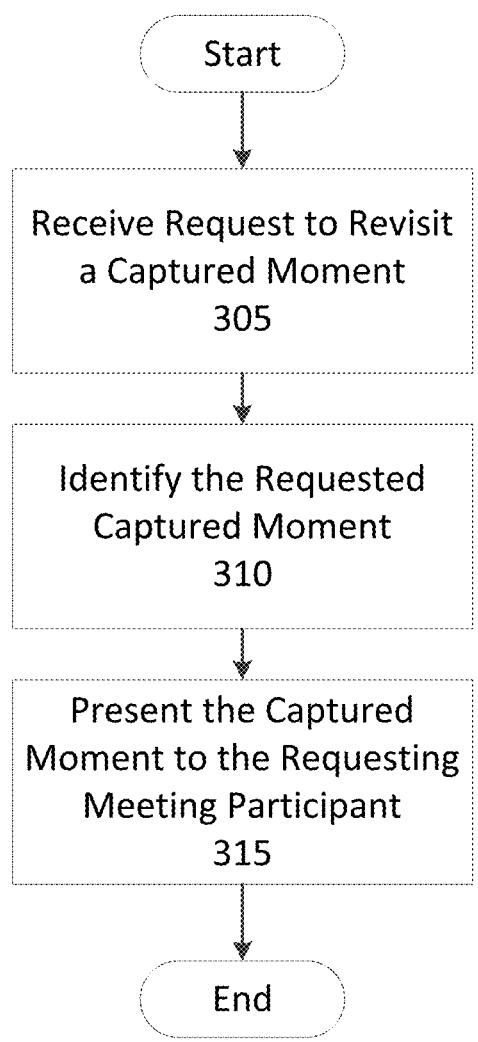
FIG. 3 shows a method of revisiting a captured moment of a teleconference.

FIG. 3 shows a method of revisiting a captured moment of a teleconference. The method is described in view of the system described in FIG. 1. As shown, the method begins at block 305 where teleconference system 120 receives a request to revisit a captured moment from a meeting participants client device 105. Revisiting a captured moment can include presenting the teleconference data shared during the duration of the captured moment. This can include presenting the audio and video data as well as any shared documents etc. that were presented during the duration of the captured moment.

The request to revisit the captured moment can be received by teleconference system 120 as a result of a meeting participant selecting or interacting with a captured moment indicator. A captured moment indicator can be configured to receive a user input, such as a selection by clicking on the captured moment indicator, thereby enabling the meeting participant to select to revisit the captured moment represented by the captured moment indicator. Selection of a captured moment indicator can cause the meeting participant's client device 105 to transmit a request to teleconference system 120 to revisit the captured moment. The request to revisit the captured moment can include metadata describing the request, such as data identifying the captured moment, the requesting meeting participant, etc.

At block 310, teleconference system 120 identifies the requested captured moment. Teleconference system 120 can assign each captured moment an identifier, which can be embedded in the corresponding captured moment indicator. The identifier can be transmitted as part of the request to revisit the captured moment and the teleconference system 120 can use the received identifier to identify the captured moment.

In some embodiments, teleconference system 120 can name each captured moment according to the identifier and then identify the corresponding captured moment accordingly. Alternatively, teleconference system 120 can maintain a captured moment index that is a file of document listing the captured moment identifiers and the location of their corresponding captured moment in memory. Teleconference system 120 can then search the captured moment index based on the received moment capture identifier to identify the captured moment.

In some embodiments, teleconference system 120 can record the start time and end time of each captured moment in the captured moment index, as well as an identifier for the corresponding teleconference. Teleconference system 120 can then search the captured moment index to identify the start time and end time of the captured moment, which can be used to access the corresponding teleconference data for the duration of the captured moment.

At block 315, teleconference system 120 can present the captured moment to the requesting meeting participant. This can include providing the teleconference data shared as part of the teleconference for the duration of the captured moment to the requesting meeting participant's client device 105, where it can be presented to the meeting participant. This can allow the meeting participant to revisit the captured moment as it was originally presented as part of the teleconference.

Figure 4A:
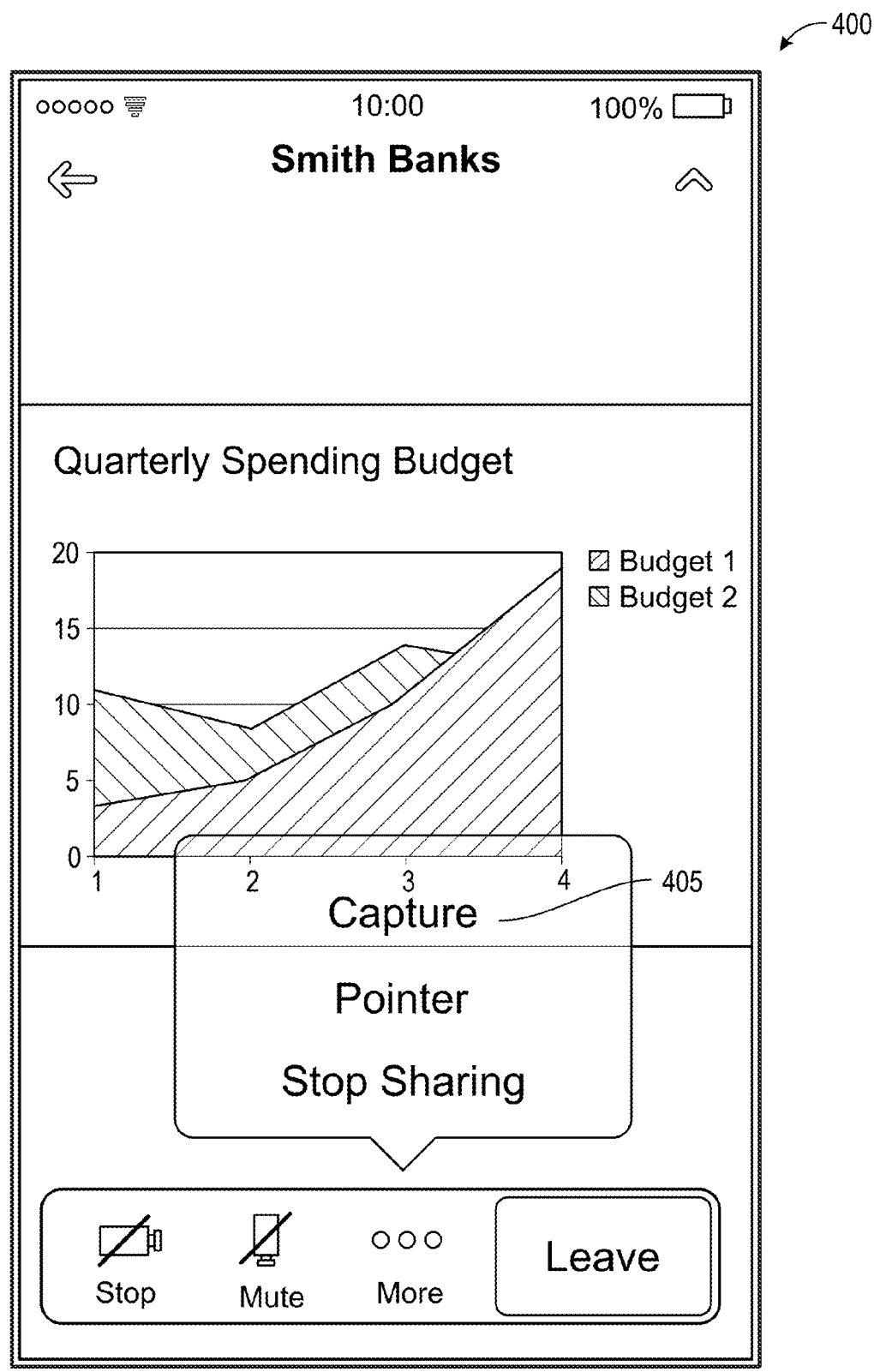
FIGS. 4A-4C show screenshots of capturing a moment of a teleconference.
Figure 4B:
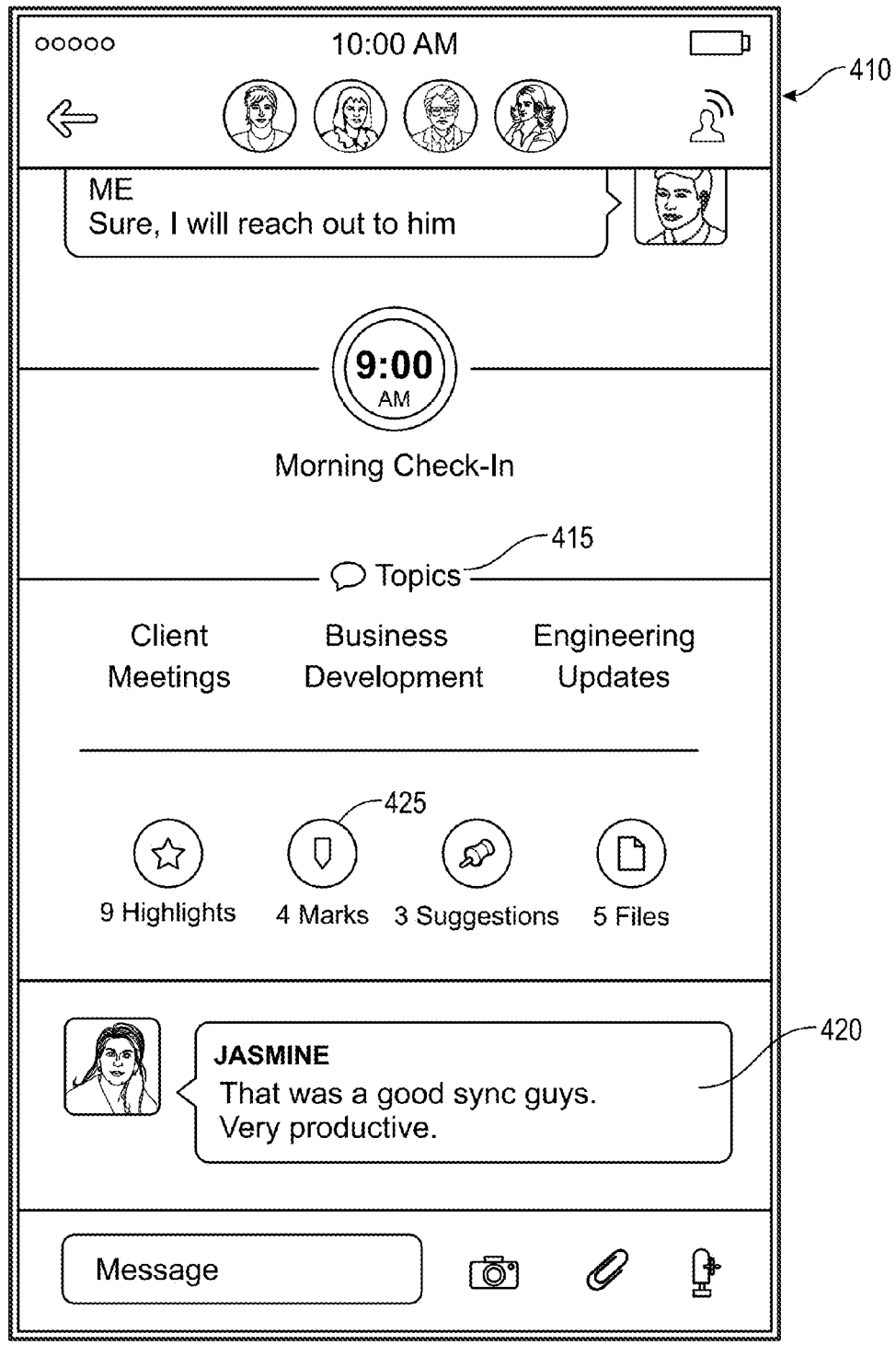
Figure 4C:
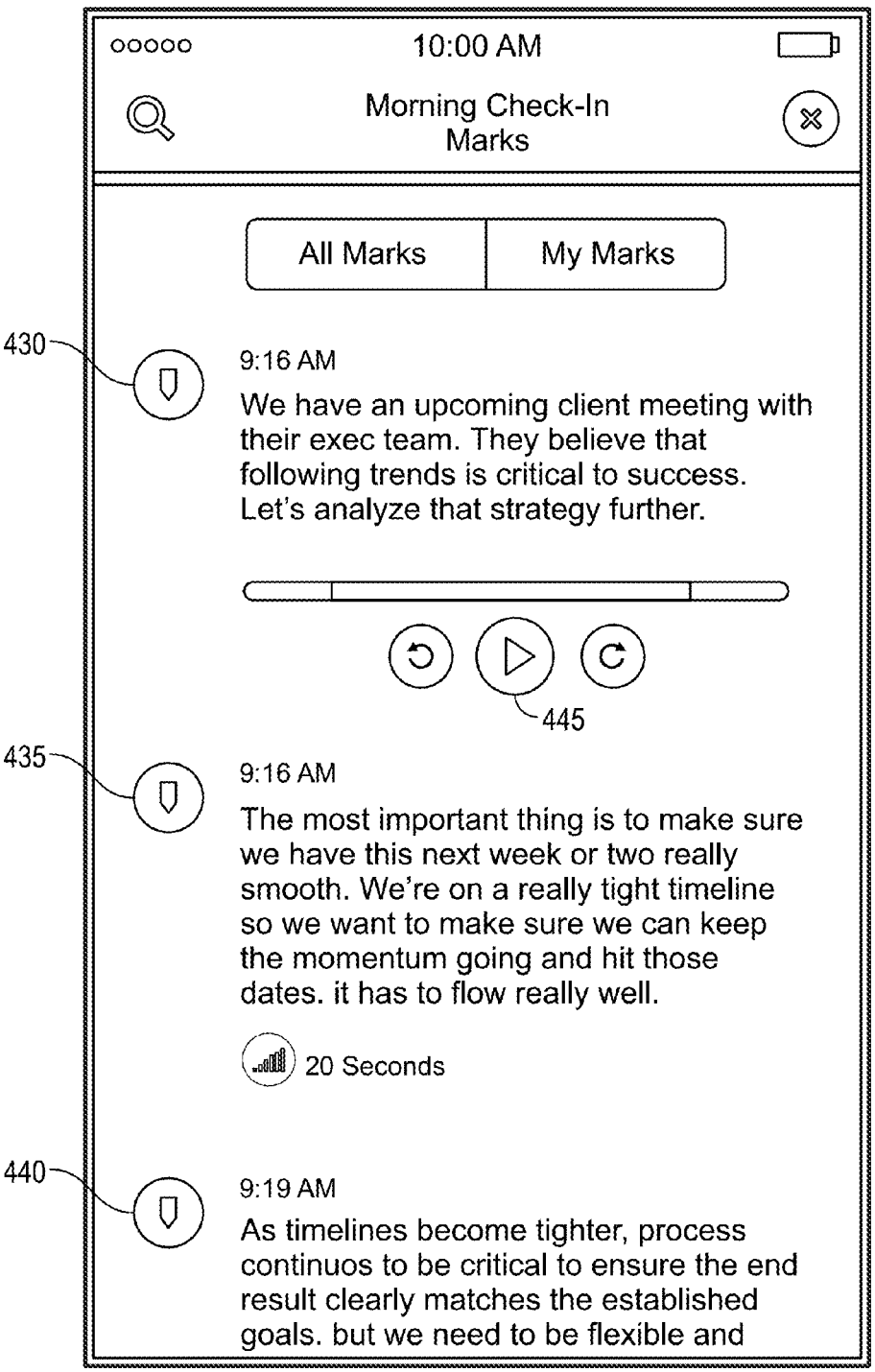

FIGS. 4A-4C show screenshots of capturing a moment of a teleconference. FIG. 4A shows a screenshot of a teleconference 400 where a meeting participant can capture a moment of the teleconference. As shown, the meeting participant is presented with user interface element 405 as part of the teleconference. User interface element 405 can be configured to enable a meeting participant to capture a moment of the teleconference. For example, to capture a moment, the meeting participant can interact with user interface element 405 by clicking or tapping user interface element 405, which can cause the meeting participants client device to transmit a moment capture request to the teleconference system. This allows a meeting participant to quickly and easily capture a moment of the teleconference.

FIG. 4B shows a screenshot of a meeting summary 410 that can be presented to meeting participants at the conclusion of or during a teleconference. As shown, the meeting summary 410 lists topics 415 that were discussed during the teleconference, as well as comments 420 provided by meeting participants. Further, the meeting summary 410 provides captured moment indicator 425 that identifies the moments captured during the teleconference. As shown, captured moment indicator 425 does not represent a single captured moment, but rather the group of all captured moments during the teleconference. Captured moment indicator 425 can be selectable to enable a meeting participant to view each individual captured moment in greater detail.

FIG. 4C shows a screenshot resulting from a meeting participant selecting captured moment indicator 425 to view the individual captured moments in greater detail. As show, multiple captured moment indicators 430, 435, 440, are shown along a timeline bar. Each captured moment indicator 430, 435, 440 includes a timestamp indicating the time at which the captured moment occurred. Further, the captured moment indicators 430, 435, 440 are listed along the timeline bar in chronological order. For example, captured moment indicator 430 has a time stamp of 9:16 am and is listed first, whereas captured moment indicator 440 has a time stamp of 9:19 am as is listed last.

Each captured moment indicator 430, 435, 440 includes a comment provided by a meeting participant. For example, the meeting participant that captured the moment can include a comment to describe why the captured moment was important or relevant to the group. Further, the captured moment indicators 430, 435, 440 can be selectable to enable the meeting participants to revisit the captured moment. As shown, captured moment indicator 430 includes play button 445 that can be selected to revisit the captured moment represented by captured moment indicator 430.

Figure 5A:
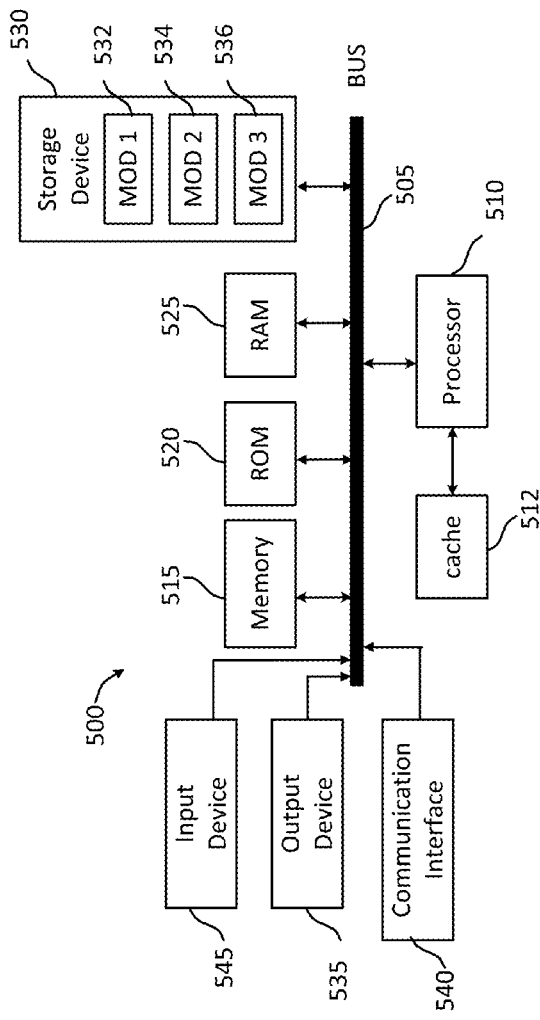
FIGS. 5A and 5B show example possible system embodiments
Figure 5B:
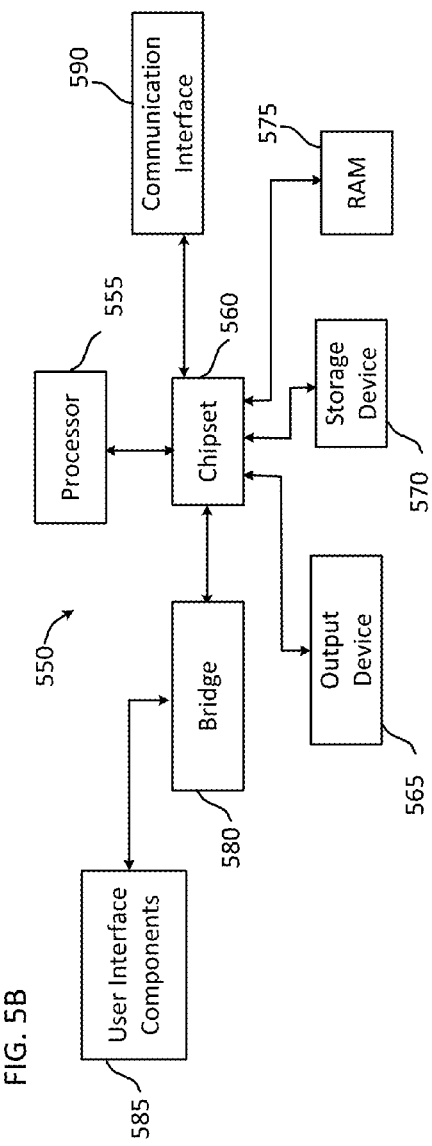

FIG. 5A, and FIG. 5B show example possible system embodiments. The more appropriate embodiment will be apparent to those of ordinary skill in the art when practicing the present technology. Persons of ordinary skill in the art will also readily appreciate that other system embodiments are possible.

FIG. 5A shows a conventional system bus computing system architecture 500 wherein the components of the system are in electrical communication with each other using a bus 505. Example system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B shows a computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

It can be appreciated that example systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
receiving, by a computer processor, a first moment capture request indicating that a first participant of a teleconference would like to capture a first moment of the teleconference, wherein the first moment spans a first duration of the teleconference, wherein the request received from the first participant specifies the first duration of the first moment;
capturing, by the computer processor, the first moment of the teleconference to yield a first captured moment, wherein the first captured moment includes teleconference data presented as part of the teleconference during the first duration of the teleconference;
presenting, by the computer processor, a first captured moment indicator to at least the first participant and a second participant of the teleconference, wherein:
the first captured moment indicator represents the first captured moment, and
the first captured moment indicator is selectable to cause presentation of the first captured moment; and
calculating a social strength of the first captured moment, the social strength based on feedback received to the first captured moment from participants of the teleconference.

2. The method of claim 1, further comprising:
receiving a request indicating that the second participant would like to revisit the first captured moment, wherein the request was transmitted as a result of the second participant selecting the first captured moment indicator; and
presenting, to the second participant, the first captured moment, wherein presenting the first captured moment includes presenting the teleconference data presented as part of the teleconference during the first duration of the teleconference.

3. The method of claim 1, further comprising:
generating a first artifact including the teleconference data presented as part of the teleconference during the first duration of the teleconference; and
providing the first artifact to the first participant.

4. The method of claim 1, further comprising:
receiving a second moment capture request indicating that the second participant of the teleconference would like to capture a second moment of the teleconference, wherein the second moment spans a second duration of the teleconference;
capturing the second moment of the teleconference to yield a second captured moment, wherein the second captured moment includes teleconference data presented as part of the teleconference during the second duration of the teleconference; and
presenting a second captured moment indicator to at least the first participant and the second participant of the teleconference, wherein:
the second captured moment indicator represents the second captured moment, and
the second captured moment indicator is selectable to cause presentation of the second captured moment.

5. The method of claim 4, further comprising:
determining, from the first duration and the second duration, that the first captured moment was captured by the first meeting participant and the second meeting participant.

6. The method of claim 1, further comprising:
determining that the social strength of the first captured moment is greater than a social strength of a second captured moment of the teleconference; and
presenting the first captured moment indicator more prominently than a second captured moment indicator representing the second captured moment.

7. The method of claim 1, wherein the feedback received to the first captured moment comprises a number of participants of the teleconference that captured the first moment.

8. A system comprising:
a computer processor; and
a memory containing instructions that, when executed, cause the computer processor to:
receive a first moment capture request indicating that a first participant of a teleconference would like to capture a first moment of the teleconference, wherein the first moment spans a first duration of the teleconference, wherein the request received from the first participant specifies the first duration of the first moment;
capture the first moment of the teleconference to yield a first captured moment, wherein the first captured moment includes teleconference data presented as part of the teleconference during the first duration of the teleconference;
present a first captured moment indicator to at least the first participant and a second participant of the teleconference, wherein:
the first captured moment indicator represents the first captured moment, and
the first captured moment indicator is selectable to cause presentation of the first captured moment; and
calculate a social strength of the first captured moment based on feedback received to the first captured moment from participants of the teleconference.

9. The system of claim 8, wherein the instructions further cause the computer processor to:
receive a request indicating that the second participant would like to revisit the first captured moment, wherein the request was transmitted as a result of the second participant selecting the first captured moment indicator; and
present, to the second participant, the first captured moment, wherein presenting the first captured moment includes presenting the teleconference data presented as part of the teleconference during the first duration of the teleconference.

10. The system of claim 8, wherein the instructions further cause the computer processor to:
generate a first artifact including the teleconference data presented as part of the teleconference during the first duration of the teleconference; and
provide the first artifact to the first participant.

11. The system of claim 8, wherein the instructions further cause the computer processor to:
receive a second moment capture request indicating that the second participant of the teleconference would like to capture a second moment of the teleconference, wherein the second moment spans a second duration of the teleconference;
capture the second moment of the teleconference to yield a second captured moment, wherein the second captured moment includes teleconference data presented as part of the teleconference during the second duration of the teleconference; and present a second captured moment indicator to at least the first participant and the second participant of the teleconference, wherein:

the second captured moment indicator represents the second captured moment, and the second captured moment indicator is selectable to cause presentation of the second captured moment.

12. The system of claim 11, wherein the instructions further cause the computer processor to:

determine, from the first duration and the second duration, that the first captured moment was captured by the first meeting participant and the second meeting participant.

13. The system of claim 8, wherein the instructions further cause the computer processor to:

determine that the social strength of the first captured moment is greater than a social strength of a second captured moment of the teleconference; and present the first captured moment indicator more prominently than a second captured moment indicator representing the second captured moment.

14. The system of claim 8, wherein the feedback received to the first captured moment comprises a number of participants of the teleconference that captured the first moment.

15. A non-transitory computer-readable medium containing instructions that, when executed by a computer processor, cause the computer processor to:

receive a first moment capture request indicating that a first participant of a teleconference would like to capture a first moment of the teleconference, wherein the first moment spans a first duration of the teleconference, wherein the request received from the first participant specifies the first duration of the first moment;

capture the first moment of the teleconference to yield a first captured moment, wherein the first captured moment includes teleconference data presented as part of the teleconference during the first duration of the teleconference;

present a first captured moment indicator to at least the first participant and a second participant of the teleconference, wherein:

the first captured moment indicator represents the first captured moment, and the first captured moment indicator is selectable to cause presentation of the first captured moment; and calculate a social strength of the first captured moment based on feedback received to the first captured moment from participants of the teleconference.

16. The non-transitory computer-readable medium of claim 15, wherein the instructions further cause the computer processor to:

receive a request indicating that the second participant would like to revisit the first captured moment, wherein the request was transmitted as a result of the second participant selecting the first captured moment indicator; and present, to the second participant, the first captured moment, wherein presenting the first captured moment includes presenting the teleconference data presented as part of the teleconference during the first duration of the teleconference.

17. The non-transitory computer-readable medium of claim 15, wherein the instructions further cause the computer processor to:

generate a first artifact including the teleconference data presented as part of the teleconference during the first duration of the teleconference; and provide the first artifact to the first participant.

18. The non-transitory computer-readable medium of claim 15, wherein the instructions further cause the computer processor to:

receive a second moment capture request indicating that the second participant of the teleconference would like to capture a second moment of the teleconference, wherein the second moment spans a second duration of the teleconference;

capture the second moment of the teleconference to yield a second captured moment, wherein the second captured moment includes teleconference data presented as part of the teleconference during the second duration of the teleconference; and present a second captured moment indicator to at least the first participant and the second participant of the teleconference, wherein:

the second captured moment indicator represents the second captured moment, and the second captured moment indicator is selectable to cause presentation of the second captured moment.

19. The non-transitory computer-readable medium of claim 18, wherein the instructions further cause the computer processor to:

determine, from the first duration and the second duration, that the first captured moment was captured by the first meeting participant and the second meeting participant.

20. The non-transitory computer-readable medium of claim 15, wherein the instructions further cause the computer processor to:

determine that the social strength of the first captured moment is greater than a social strength of a second captured moment of the teleconference; and present the first captured moment indicator more prominently than a second captured moment indicator representing the second captured moment.

21. The non-transitory computer-readable medium of claim 15, wherein the feedback received to the first captured moment comprises a number of participants of the teleconference that captured the first moment.

* * * * *